US012681220B2

(12) United States Patent
Higuchi et al.

(10) Patent No.:    US 12,681,220 B2
(45) Date of Patent:        Jul. 14, 2026

(54) MIRROR AND HEAD-UP DISPLAY DEVICE

(71) Applicant: NIPPON SEIKI CO., LTD., Niigata (JP)

(72) Inventors: Tetsuta Higuchi, Niigata (JP); Akitoshi Koshiba, Niigata (JP); Hiroyuki Furusawa, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 388 days.

(21) Appl. No.: 18/327,668

(22) Filed: Jun. 1, 2023

(65) Prior Publication Data

US 2023/0400611 A1      Dec. 14, 2023

(30) Foreign Application Priority Data

Jun. 13, 2022    (JP) ................................. 2022-095260

(51) Int. Cl.
　*G02B 1/14*　　　(2015.01)
　*G02B 5/08*　　　(2006.01)
　*G02B 27/01*　　(2006.01)

(52) U.S. Cl.
　CPC ............. *G02B 5/0841* (2013.01); *G02B 1/14* (2015.01); *G02B 27/0101* (2013.01); *G02B 27/0149* (2013.01); *G02B 2027/0154* (2013.01)

(58) Field of Classification Search
　CPC .... G02B 5/0841; G02B 1/14; G02B 27/0101; G02B 27/0149
　See application file for complete search history.

(56) References Cited

U.S. PATENT DOCUMENTS

| | | | |
|---|---|---|---|
| 2003/0218807 A1 | 11/2003 | Handa et al. | |
| 2004/0233530 A1 | 11/2004 | Kramer et al. | |
| 2008/0252862 A1 | 10/2008 | Okura et al. | |
| 2017/0254936 A1 | 9/2017 | Morita | |
| 2019/0278053 A1* | 9/2019 | Takahashi | B60K 35/23 |
| 2021/0080718 A1* | 3/2021 | Sato | G02B 27/0101 |
| 2021/0181504 A1* | 6/2021 | Sugiyama | B60K 35/23 |
| 2022/0236560 A1 | 7/2022 | Akiyama et al. | |
| 2023/0350198 A1* | 11/2023 | Hori | G02B 27/0101 |

FOREIGN PATENT DOCUMENTS

| | | | | |
|---|---|---|---|---|
| CN | 109270600 A | * | 1/2019 | G02B 27/0101 |
| CN | 109324362 B | * | 4/2021 | H02S 40/22 |
| JP | 2000-241612 A | | 9/2000 | |

(Continued)

*Primary Examiner* — Matthew Y Lee
(74) *Attorney, Agent, or Firm* — Rimon P.C.

(57)        ABSTRACT

To provide a mirror in which an optical film more firmly adheres to a base material, and a head-up display device including the mirror. A mirror disclosed herein includes a base material that is formed of a synthetic resin material, an adhesion layer that is provided on one surface of the base material, and an optical film that adheres to the base material by the adhesion layer and reflects light, wherein an adhesion surface including silicon is formed between the base material and the adhesion layer. Further, a head-up display device disclosed herein includes a display unit that emits display light, the mirror described above that reflects the display light, and a housing that houses the display unit and the mirror and in which an opening portion through which the display light passes to a windshield is formed.

7 Claims, 3 Drawing Sheets

(56) References Cited

FOREIGN PATENT DOCUMENTS

| JP | 2001-074922 | A | 3/2001 | | |
| JP | 2002-196120 | A | 7/2002 | | |
| JP | 2002-228815 | A | 8/2002 | | |
| JP | 2003-532925 | A | 11/2003 | | |
| JP | 3645398 | B2 | 5/2005 | | |
| JP | 2005-208212 | A | 8/2005 | | |
| JP | 2006-133331 | A | 5/2006 | | |
| JP | 2011-095658 | A | 5/2011 | | |
| JP | 2020-114626 | A | 7/2020 | | |
| JP | 2022-119639 | A | 8/2022 | | |
| WO | WO-2015194455 | A1 * | 12/2015 | .............. | G02B 5/08 |
| WO | 2018/110176 | A1 | 6/2018 | | |
| WO | WO-2020246546 | A1 * | 12/2020 | .......... | G02B 5/0841 |

* cited by examiner

MIRROR AND HEAD-UP DISPLAY DEVICE

CROSS REFERENCE TO RELATED APPLICATIONS

The present application claims priority from Japanese Patent Application No. 2022-095260 filed on Jun. 13, 2022, the entire contents of which are hereby incorporated by reference.

TECHNICAL FIELD

The present invention relates to a mirror and a head-up display device.

BACKGROUND ART

Patent Document 1 discloses a mirror that is used in a head-up display device. The mirror is a reflection mirror (4) including a reflection layer (41) that is formed by layering a plurality of resin films having different refractive indexes, adhesion layer (42), and a base material (43) to which the reflection layer (41) is adhered via the adhesion layer (42).

PRIOR ART DOCUMENT

Patent Document

Patent Document 1: International Publication No. 2020-246546

SUMMARY OF INVENTION

Technical Problem

The inventers have found that, in the mirror having the conventional configuration, there is still a room for improvement in the adhesion between the optical films that form the reflection layer and the base material. According to the above, the object of the present invention is, by paying attention to the above-described problem, to provide a mirror in which an optical film more firmly adheres to a base material, and a head-up display device including the mirror.

Solution to Problem

In order to achieve the above-described object, a mirror disclosed herein includes: a base material that is formed of a synthetic resin material; an adhesion layer that is provided on one surface of the base material; and an optical film that adheres to the base material by the adhesion layer and reflects light; wherein a protective layer including silicon is formed between the base material and the adhesion layer.

Further, in order to achieve the above-described object, the head-up display device disclosed herein includes: a display unit that emits display light; the mirror described above that reflects the display light; and a housing that houses the display unit and the mirror and in which an opening through which the display light L passes to a transmission reflection member is formed.

Note that a configuration of the head-up display device disclosed herein is not limited to the configuration described above and the above-described object can be achieved by applying a variety of mirrors disclosed herein.

DESCRIPTION OF EMBODIMENTS

Figure 1:
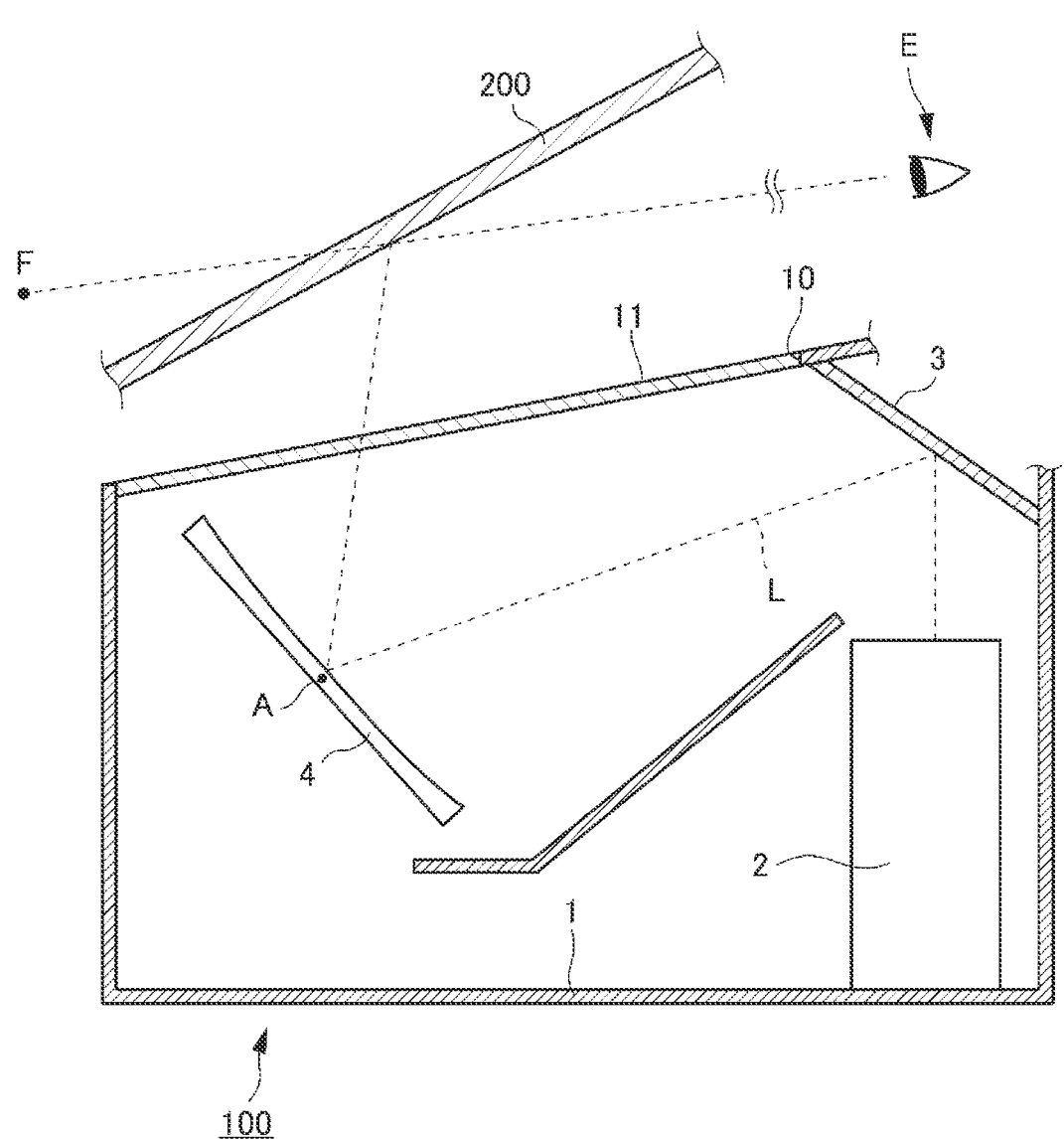
FIG. 1 is a schematic sectional view showing a configuration of a head-up display device according to one embodiment of the present invention.

Hereinafter, a mirror and a head-up display device disclose herein are exemplified as an embodiment and a modified example, and are explained with reference to the appended drawings in an order described below. Note that, for simplicity, reference numerals may be appended to only some of parts existing in a plurality of figures and having a same property.

[First Embodiment]
1-1. Explanation of Configuration
1-2. Explanation of Mirror 4
1-3. Explanation of Adhesion Surface 40*a*
[Modified Example]

First Embodiment

<1-1. Explanation of Configuration>

Figure 2:
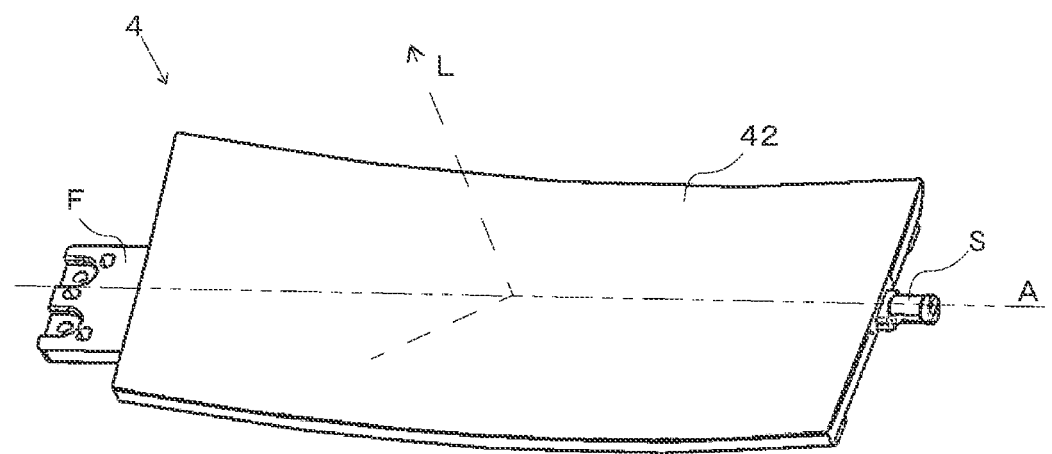
FIG. 2 is a perspective view showing a mirror included in the head-up display device.

A head-up display device 100 is, for example, a device mounted on a vehicle and, as shown in FIG. 1 and FIG. 2, includes a housing 1, a display unit 2, a flat surface mirror 3, a mirror 4, a mirror rotating mechanism 5, and a circuit board that is not shown.

The head-up display device 100 reflects, by the flat surface mirror 3 and the mirror 4, display light L that is emitted by the display unit 2 for displaying a predetermined image, and irradiates the reflected light onto a windshield 200 of the vehicle on which the head-up display device 100 is mounted, and thereby displaying is conducted. Contents displayed by the head-up display device 100 is vehicle information such as a travel speed and a variety of warnings of the vehicle, and navigation information, etc.

The housing 1 is made of, for example, black-colored synthetic resin, and houses therein the display unit 2, the flat surface mirror 3, the mirror 4, the mirror rotating mechanism 5, and the circuit board (not shown). An opening portion 10 through which the display light L described below passes to the windshield 200 (transmission reflection member) is formed on a part of the housing 1 facing the windshield 200. The opening portion 10 is covered by a translucent cover 11.

The display unit 2 emits the display light L that displays an image (information image) for informing a predetermined information (a variety of vehicle information and a navigation information, etc.), and is configured by, for example, a transmission type liquid crystal display configured by a liquid crystal panel and a light source for back light, or a self-luminous type display.

The flat surface mirror 3 reflects the display light L emitted by the display unit 2 to the mirror 4.

The mirror 4 further reflects the display light L reflected by the flat surface mirror 3 to the windshield 200. The mirror 4 is configured as a concave mirror that is formed by adhering an optical film (reflection layer) on a surface of a base material made of a synthetic resin material by an adhesion layer. The mirror 4 includes a shaft portion S and a flange portion F on both end portions in a direction of a rotation axis line A. The flange portion F is a portion to which a shaft portion (not show) that can slide and rotate around the rotation axis line A is mounted. The mirror 4 rotates around a direction of the rotation axis line A at the shaft portion as a fulcrum to adjust a reflection angle of the display light L. Note that the mirror 4 is specifically described below.

The display light L reflected by the mirror 4 passes through the translucent cover 11 provided on the opening portion 10 of the housing 1 toward the windshield 200. The display light L that reaches to and is reflected by the windshield 200 forms a virtual image of the information image (a display image seen by a watcher E) at a virtual image position V (see FIG. 1) in front of the windshield 200, and at the same time, light from the front side is transmitted. According to the above, the head-up display device 100 can allow both of the virtual image and an outside view, etc. actually existing in front of the windshield 200 to be visually recognized by the watcher E (mainly a driver of the vehicle).

The mirror rotating mechanism 5 rotates the mirror 4 around the rotation axis line A and, for example, is configured by a bearing member that supports the shaft portion and a rotation actuation portion. The rotation actuation portion includes a frame, a motor, a lead screw shaft, and a lead member. The frame fixes and supports the motor and rotatably supports the lead screw shaft. Further, the frame restricts the rotation of the lead member around the lead screw shaft. The motor is a stepping motor that generates a driving force for rotating the mirror 4 around the rotation axis line A. The lead screw shaft is connected to an output shaft of the motor and rotates in a normal direction or a reverse direction according to actuation of the motor. The lead member includes a screw-engagement portion with which the lead screw shaft is engaged and a connecting portion that is connected to a connecting lever portion of a shaft portion by contacting to the connecting lever portion. When the lead screw shaft is rotated by actuation of the motor, the lead member whose rotation around the lead screw shaft is restricted by the frame is moved along the axis line of the lead screw shaft. According to the above, for example, when the mirror 4 is pushed via a protrusion provided on the mirror 4, the mirror 4 is rotated around the rotation axis line A and the reflection angle of the mirror 4 is changed.

The circuit board that is not shown is a print circuit board that is disposed, for example, at a predetermined position in the housing 1 and on which a control section (not shown) including a micro controller formed by combining a computing device such as a CPU, a RAM, and a ROM, etc. and a storage device is mounted. The control section of the circuit board is electrically connected to each of the display unit 2 and the rotation actuation portion 9. The control section acquires a state information of the vehicle transmitted through a communication line from an external device (not shown) such as an electronic control unit (ECU) of the vehicle and actuates the display unit 2 according to the state information (that is, makes the display unit 2 to display a predetermined information image). Further, the head-up display device 100 is provided with an input means (not shown) via which a user such as the watcher E, etc. adjusts the angle of the mirror 4 (this input means may be an external device of the head-up display device 100 that is electrically connected to the control section), and the control section actuates the rotation actuation portion to rotate the mirror 4 around the rotation axis line A by a predetermined angle according to a manipulation operation by the user via the input means. By the adjustment of the angle of the mirror 4 described above, the virtual image can be displayed at a suitable position that corresponds to the height of the driver's line of sight.

<1-2. Explanation of Mirror 4>

Figure 3:
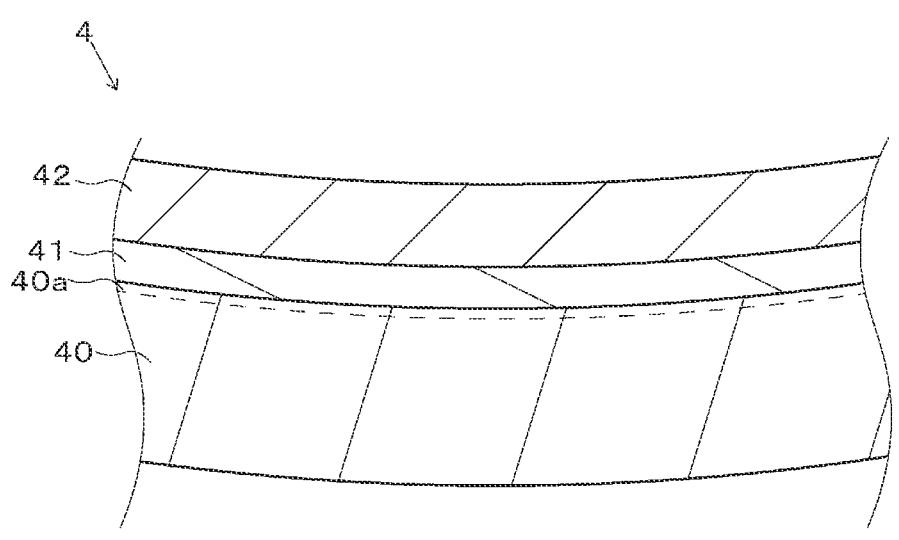
FIG. 3 is a view showing a cross section of an important part of the mirror 4.

In the clause 1-2, especially the mirror 4 is specifically explained. FIG. 3 is a view showing a cross section of an important part of the mirror 4 on a plane including the rotation axis line A and an optical film 42 (reflection layer). The mirror 4 is a concave mirror that is formed by adhering an optical film 42 on a surface of the base material 40 made of a synthetic resin material by an adhesion layer 41.

A material having high liquidity and high rigidity is selected for the synthetic resin material of the base material 40. The synthetic resin material having high liquidity increases formability (accuracy of surface shape, etc.) of the mirror 4. The synthetic resin material having high rigidity increases yield strength of the mirror 4 against a vibration. From a point of view described above, cyclic olefin based resin and polycarbonate are selected for the synthetic resin material. The specific example of the cyclic olefin based resin includes cyclo-olefin polymer (COP) and cyclic olefin copolymer (COC).

Further, the base material 40 may be made of a crystalline heat resistant polymer, etc. More specifically, engineering plastics such as polybutylene terephthalate (PBT), polyethylene terephthalate (PET), polyacetal (POM), polyamide (PA), modified poly phenylene ether (m-PPE), and poly phenylene sulfide (PPS), etc. may be used.

Note that the synthetic resin material that may be applied for the base material 40 is formed in a state in which filler is included in the material as described below.

In the first embodiment, the base material 40 preferably has a dark color. The dark-colored base material 40 can decrease a possibility that, when transmitted light enters the optical film 42, the light is reflected to the watcher E and the display unit 2.

The adhesion layer 41 is provided on one side (surface) of the base material 40. The adhesion layer 41 adheres the optical film 42 to the base material 40. Although a variety of adhesives may be applied for the adhesion layer 41, for example, optical clear adhesive (OCA) and optical clear resin (OCR) are preferable, and a double-sided adhesive tape, epoxy resin, and a hardening agent may be used. An acrylic gluing agent is especially suitable for the adhesion layer 41. The acrylic gluing agent is a preferable configuration since the acrylic gluing agent has an adhesive property suitable for a variety of optical films and can be manufactured at a low cost.

The optical film 42 is a reflection member that reflects the display light L emitted by the display unit 2. The optical film 42 may be a mirror film that totally reflects the display light L. It is especially preferable that the optical film 42 is a cold mirror film. A polarization reflection type cold mirror film is a mirror film made of a dielectric multilayer film, and is a selectively light-reflecting optical film that only reflects visible light, among incident light, which is polarized light in a certain direction and allows light other than the visible light to pass through the film. The polarization reflection type cold mirror film prevents polarized light in a direction different from that of the display light L and infrared light in sunlight entering from an outside from reaching to the display unit 2, etc. and thereby heating the display unit 2, etc. Note that the optical film 42 may be a visible light reflecting film that has no polarization property.

<1-3. Explanation of Adhesion Surface 40a>

The adhesion layer 41 is especially provided on an adhesion surface 40a that is a surface of the base material 40. The adhesion surface 40a is configured as described below in order to make a mirror in which the optical film 42 more firmly adheres to the base material 40.

The adhesion surface 40*a* is formed of a protective layer including silicon. The adhesion surface 40*a* is preferably a protective layer such as a vitreous coating, and is desirably a protective layer including, for example, silicon dioxide or silicon monoxide.

The adhesion surface 40*a* may be made of the above-described protective layer by any method. For example, the protective layer is formed by burning silane compound applied on a surface corresponding to the adhesion surface 40*a* of the base material 40.

Here, a problem in the conventional configuration that the present inventers have found. The present inventers have found that, in the conventional mirror including an optical film that adheres to a base material by an adhesion layer, there is a possibility that an air bubble is generated in the optical film and the optical film peels off. The present inventers have determined that these events occur when volatilized gas from the base material enters an interface between the adhesion layer and the base material. In many cases, the volatilized gas is water vapor that comes from water included in the base material. The water included in the base material is vaporized especially after the base material is injection molded or when the base material is exposed to a heated atmosphere, and thereby, the water vapor is generated. Note that the volatilized gas may be some kind of gases other than water vapor.

In order to prevent this event, it is possible to use a special adhesion layer that prevent the volatilized gas from entering the optical film. However, in many cases, the manufacturing cost of such adhesion layer having high quality is high and it is difficult to adopt such adhesion layer.

According to the above, the above-described adhesion surface that is the protective layer is applied to the mirror 4 disclosed herein. In the configuration in which the protective layer is provided on the surface of the base material 40 as described above, when volatilized gas is generated from inside of the base material 40, the amount of the volatilized gas that passes through the adhesion surface 40*a* is significantly reduced, and the possibility that the remarkable air bubbles are generated in an interface between the base material 40 and the adhesion layer 41 and that the adhesion layer 41 remarkably peels off from the base material 40 can be reduced. Note that, in this case, the volatilized gas is released to the circumstance of the base material 40 through its surfaces other than the adhesion surface 40*a*.

The mirror 4 including the adhesion surface 40*a* formed as described above is a mirror in which an increase in cost is suppressed and a reflection layer more firmly adheres to a base material.

Modified Example

Although the embodiment is specifically described hereinbefore, the present invention is not limited to the particular embodiment and can be modified and changed in various ways in a range described in claims. Further, all or a plurality of components of the embodiment described above can be combined.

The configuration of the optical film may be a touch panel film and transmission type polarizing plate, etc. When such optical film is applied, it is also desirable that the optical film is applied to another display device in addition to the head-up display device.

For example, the display device can be configured as a display device including a display unit that emits display light, an optical film through which the display light is transmitted, a base material made of a synthetic resin material to which the optical film is adhered, and an adhesion layer that adheres the optical film to the base material. Even in this case, the possibility that an air bubble is generated in the optical film by the volatilized gas from the base material and that the optical film peels off from the base material due to the volatilized gas from the base material can be reduced Note that, in this case, it is desirable that the base material is made of transparent synthetic resin.

Further, it is preferable that the base material described in the first embodiment is made of a synthetic resin material having high rigidity.

Further, the configuration of the adhesion surface may be, in addition to the configuration described as the vitreous coating, a coating including a silane compound and titanium oxide IV. That is, it is sufficient that the coating reduce an amount of the volatilized gas that is generated from the base material and enters into the interface between the adhesion layer and the base material. Note that, among the configurations exemplified above, the vitreous coating including silicon is suitable for the protective layer from the view point of manufacturing cost.

The shaft portion and the flange portion of the mirror may not be formed integrally. However, in the mirror that is formed by adhering the optical film to the base material, a degree of freedom of designing the base material is increased with respect to the configuration in which the reflection surface is directly deposited onto the base material.

Therefore, when the mirror needs to include mechanical components such as the shaft portion and the flange portion, a number of parts can be reduced ant the cost can be reduced by forming the mechanical components integrally with the base material.

The head-up display device disclosed herein may be mounted on, in addition to an automobile, a vehicle such as a work vehicle and a motorcycle, a vessel, and an air plane, etc.

REFERENCE SIGNS LIST

100 head-up display device
1 housing
10 opening portion
11 translucent cover
2 display unit
3 flat surface mirror
4 reflecting portion
40 base material
40*a* adhesion surface
41 adhesion layer
42 optical film
5 reflecting portion rotating mechanism
200 windshield
L display light
S shaft portion
F flange portion
V virtual image position

The invention claimed is:

1. A mirror comprising:

a base material that is formed of a synthetic resin material;

an adhesion layer that is provided on one surface of the base material;

an optical film that adheres to the base material by the adhesion layer; and a protective layer formed between the base material and the adhesion layer, the protective layer including silicon, and wherein the optical film is configured to i) reflect visible light, among incident light, which is polarized light in a certain direction, ii) allow light other than the visible light to pass through the optical film, and iii) is formed of a dielectric multilayer.

2. The mirror according to claim 1 wherein the protective layer includes silicon dioxide or silicon monoxide.

3. The mirror according to claim 1 wherein the adhesion layer is an acrylic gluing agent.

4. The mirror according to claim 1 wherein the base material is especially made of polycarbonate or cyclic olefin based resin.

5. A head-up display device comprising:

a display unit that emits display light;

the mirror according to claim 1 that reflects the display light; and a housing that houses the display unit and the mirror and in which an opening through which the display light passes to a transmission reflection member is formed.

6. The head-up display device according to claim 5 wherein the mirror is rotatably held to adjust a reflection angle of the display light; and a shaft portion that is to be a rotation shaft of the mirror is integrally formed with the base material.

7. The mirror according to claim 1, wherein the protective layer including silicon is configured to reduce an amount of gas that passes from the base material toward the adhesion layer.

\* \* \* \* \*